United States Patent
Somanath et al.

(10) Patent No.: US 11,423,308 B1
(45) Date of Patent: Aug. 23, 2022

(54) CLASSIFICATION FOR IMAGE CREATION

(71) Applicant: Apple Inc., Cupertino, CA (US)

(72) Inventors: Gowri Somanath, Santa Clara, CA (US); Daniel Kurz, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/021,340

(22) Filed: Sep. 15, 2020

Related U.S. Application Data

(60) Provisional application No. 62/903,093, filed on Sep. 20, 2019.

(51) Int. Cl.
*G06N 3/08* (2006.01)
*G06K 9/62* (2022.01)
*G06V 10/75* (2022.01)

(52) U.S. Cl.
CPC .............. *G06N 3/08* (2013.01); *G06K 9/627* (2013.01); *G06K 9/6257* (2013.01); *G06K 9/6277* (2013.01); *G06V 10/751* (2022.01)

(58) Field of Classification Search
CPC ...... G06N 3/08; G06K 9/6202; G06K 9/6257; G06K 9/627; G06K 9/6277
USPC ........................................................ 382/159
See application file for complete search history.

(56) References Cited

U.S. PATENT DOCUMENTS

| | | | |
|---|---|---|---|
| 2008/0298643 A1* | 12/2008 | Lawther | G06K 9/00677 382/118 |
| 2012/0323725 A1 | 12/2012 | Johnston et al. | |
| 2017/0142337 A1* | 5/2017 | Kokaram | H04N 5/23254 |
| 2018/0165798 A1 | 6/2018 | Lin et al. | |
| 2019/0122411 A1* | 4/2019 | Sachs | G06T 7/248 |
| 2019/0182453 A1 | 6/2019 | Lim et al. | |
| 2019/0197670 A1 | 6/2019 | Ferrer et al. | |
| 2019/0279074 A1* | 9/2019 | Lin | G06F 16/583 |
| 2019/0378332 A1* | 12/2019 | Sun | G06T 15/04 |

(Continued)

OTHER PUBLICATIONS

Dekker, Anthony; "NeuQuant: Fast High-Quality Image Quantization", Scientific Gems, https://scientificgems.wordpress.com/stuff/neuquant-fast-high-quality-image-quantization; 1994, pp. 1-20.

(Continued)

*Primary Examiner* — Michael R Neff
(74) *Attorney, Agent, or Firm* — Thompson Hine LLP

(57) ABSTRACT

Implementations disclosed herein provide systems and methods that use classification-based machine learning to generate perceptually-plausible content for a missing part (e.g., some or all) of an image. The machine learning model may be trained to generate content for the missing part that appears plausible by learning to generate content that cannot be distinguished from real image content, for example, using adversarial loss-based training. To generate the content, a probabilistic classifier may be used to select color attribute values (e.g., RGB values) for each pixel of the missing part of the image. To do so, a pixel color attribute is segmented into a number of bins (e.g., value ranges) that are used as classes. The classifier determines probabilities for each of the bins of a color attribute for each pixel and generates the content by selecting the bin having the highest probability for each color attribute for each pixel.

22 Claims, 6 Drawing Sheets

(56) References Cited

U.S. PATENT DOCUMENTS

2020/0073968 A1* 3/2020 Zhang .................. G06F 16/152

OTHER PUBLICATIONS

Mohammad, Faisel Ghazi; Amer, Wejan A.; "Effective Digital Image Colors Reduction/Quantization Method"; Iraqi Journal of Science; Jan. 2013; vol. 54, No. 1, pp. 1-7.

"Here's why quantization matters for AI"; https://www.qualcomm.com/news/onq/2019/03/12/heres-why-quantization-matters-ai; Mar. 12, 2019; pp. 1-7.

* cited by examiner

CLASSIFICATION FOR IMAGE CREATION

CROSS-REFERENCE TO RELATED APPLICATIONS

This application claims the benefit of U.S. Provisional Application Ser. No. 62/903,093 filed Sep. 20, 2019, which is incorporated herein in its entirety.

TECHNICAL FIELD

The present disclosure generally relates to generating content for images, and in particular, to systems, methods, and devices that use machine learning to generate such content.

BACKGROUND

Various techniques are used to generate image content. For example, some techniques use generative adversarial neural networks (GANs) to generate image content. GAN-based techniques generally learn to generate new data such as images with the same statistics as a training set. For example, a GAN trained on photographs may generate new images that look plausible to human observers, having many real characteristics similar to those of the training photographs. GANs may be used to generate content by determining pixel color values (e.g., predicting each of the red, green, and blue color channels) for pixels of an image or part of an image to provide content that looks like a plausible scene. Some existing techniques use regression-based approaches to generate such content, for example, regressing to particular color values for each pixel to produce outputs. The quality (e.g., plausibility) of the results of such regression-based techniques may depend on being able to adequately train the machine learning model with very large amounts of training data. Such training may be burdensome or infeasible. The generated content of such regression-based technique may also suffer from undesirable lack of sharpness at edges, lack of crispness or clearness in structures, or otherwise exhibit blurriness, reducing the plausibleness of the content.

SUMMARY

Implementations disclosed herein provide systems and methods that use classification-based machine learning to generate perceptually-plausible content for a missing part (e.g., some or all) of an image. The machine learning model may be trained to generate content for the missing part that appears plausible by learning to generate content that cannot be distinguished from real image content, for example, using adversarial loss-based training. To generate the content, a probabilistic classifier may be used to select color attribute values (e.g., RGB values) for each pixel of the missing part of the image. To do so, a pixel color attribute is segmented into a number of bins (e.g., value ranges) that are used as classes. The classifier determines probabilities for each of the bins of the pixel color attribute for each pixel and generates the content by selecting the bin for each color attribute for each pixel having the highest probability.

Some implementations provide a method of using classification-based machine learning to fill a missing part of an image. The exemplary method may be implemented by a computing device executing instructions using a processor. The method receives input data corresponding to an image of an environment that is to be generated or completed. The image has a missing part of pixels for content that is undefined by the input data, e.g., the image may have color values for some pixels, only greyscale values for some pixels, and no information for some pixels. The input data may be an image having some pixel defined and some undefined pixels. In some implementations, the input data is a camera image, a digital photograph, a computer-generated image, an image that combines real and virtual content, an equirectangular representation of a 360 degree view of three dimensional (3D) environment, or a cube map representation of a 360 degree view of a 3D environment. In some implementations, the input data may be a vector or statement describing attributes of an environment (e.g., "girl on yellow bus looking out window crying on a sunny day"). The input data may identify which pixels of the image are undefined, e.g. via a mask or other data structure.

The input data may include multiple, different types of input, for example, including a combination of two or more of an incomplete image, a vector, or a statement. For example, the input may be an incomplete image of a couple of houses with a missing sky and the statement "add a chimney to the leftmost house." In another example, the input may be a complete image of a couple of houses with all pixels defined and the same statement "add a chimney to the leftmost house." In another example, a single input may be provided that is simply a statement "generate an image with two houses in a grassy valley and add a chimney to the leftmost house."

The method generates (e.g., synthesizes, hallucinates, or otherwise creates) content for the missing part of the image by inputting the input data to a machine-learning model such as a neural network. The machine learning model uses one or more color attributes (e.g., color channels RGB) that are quantized into bins. For example, each color channel may have possible values from 1 to 255 and each color channel may be quantized into 5 bins. In this example, the red color channel may have bin 1 for red color values equal to or greater than 0 and less than 51, bin 2 for red color values equal to or greater than 51 and less than 102, bin 3 for red color values equal to or greater than 102 and less than 153, bin 4 for red color values equal to or greater than 153 and less than 204, and bin 5 for red color values equal to or greater than 204 and less than 255.

In other implementations, a color space in quantized in alternative ways, including ways that do not use uniform per-channel quantization. For example, one such technique selects a number of N points in the color space, e.g. (R,G,B) 3D vectors for RGB, which are the colors of the palette. For each pixel, the technique computes the nearest neighbor to the pixel's intensity from the set of N points using some distance metric across all color channels. This may be perceptually inspired or can simply be L2, for example.

The machine learning model may be trained to perform a dithering or to produce a dithered appearance in creating content for a missing part of an image. Dithering is an intentionally applied form of noise used to randomize quantization errors, e.g., patterns, discontinuities, etc., in content. In other implementations, a dithering technique is applied to the output of a machine learning model to add noise and improve the appearance of generated content.

The machine-learning model may be configured to generate the content by performing a classification for each pixel of the missing part for the bins and selecting a color attribute for each pixel by selecting one of the bins based on the classification. The classification may provide probabilities that represent the probability that giving a respective pixel the color attribute value associated with a bin (e.g., the average value of the bin) will result in plausible content. The machine learning model may select the color attribute based on the bin having the best probability. For example, the classification may provide probabilities for each of the 5 bins for the red color channel: 0.1, 0.1, 0.5, 0.2, 0.1 for a pixel and select bin 3 for the pixel because its probability is highest. The pixel is then given the color attribute of the value associated with bin 3, e.g., the average red value of bin 3: 128. In this way color values for the color attributes of all pixels of a missing part of an image can be selected to generate content to fill the missing part.

In some implementations, one or more post processing steps are employed on the results of the machine learning model, for example, to reduce potentially undesirable artifacts of the quantization. For example, a second network, may be trained and employed to increase color resolution. As another example, edge preserving smoothing, such as bilateral or joint-bilateral filtering, may be applied. As another example, global smoothing, such as Gaussian filtering, may be applied.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
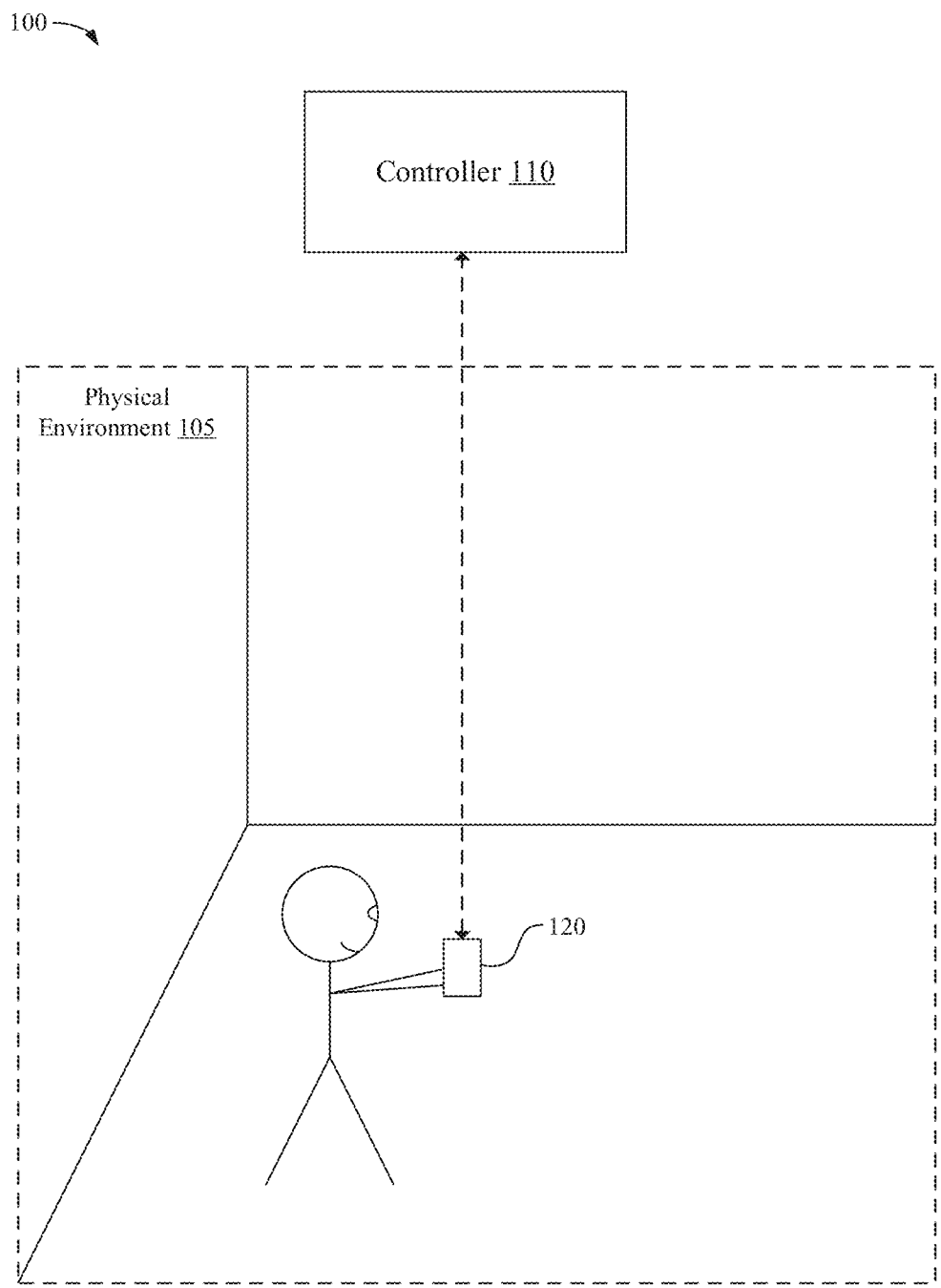
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
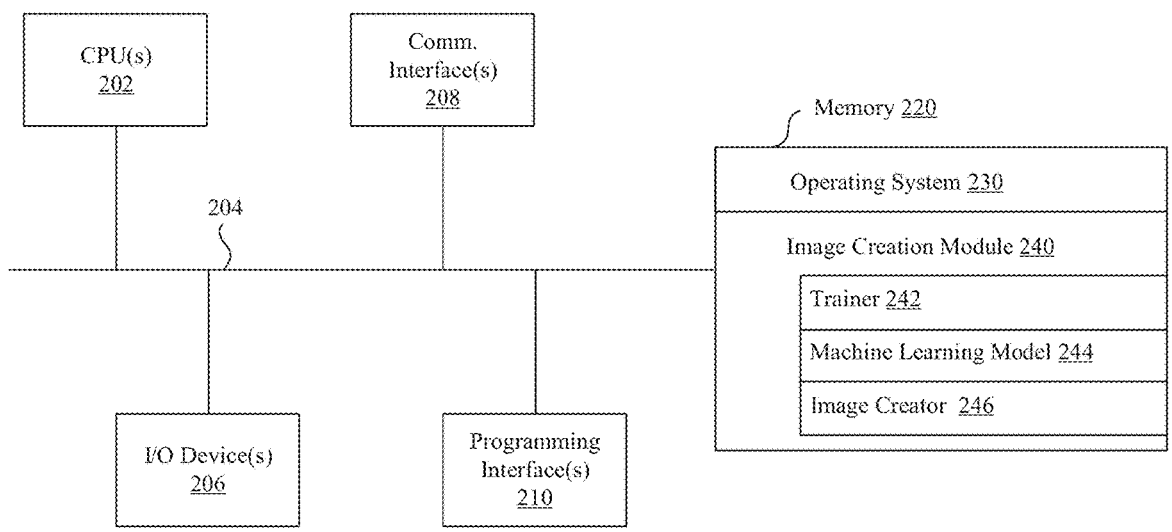
FIG. 2 is a block diagram of an example controller in accordance with some implementations.
Figure 3:
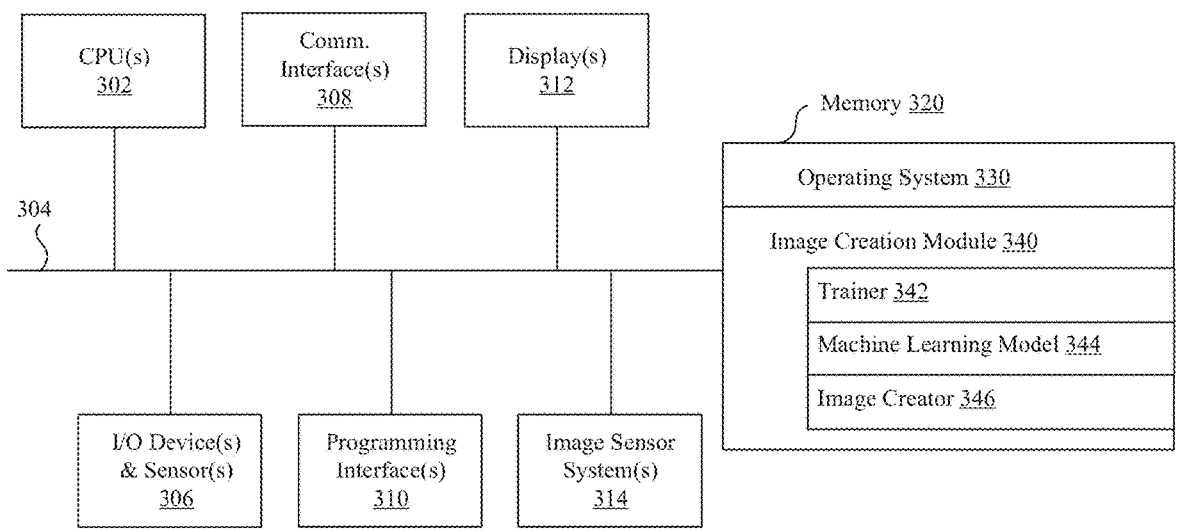
FIG. 3 is a block diagram of an example electronic device in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving a handheld electronic device, other implementations do not necessarily involve an handheld device and may involve other types of devices including, but not limited to, televisions, set-top devices, laptops, desktops, gaming devices, home automation devices, watches, head-mounted devices (HMDs), and other wearable electronic devices, and other devices that process or display content.

Implementations disclosed herein provide systems and methods that use classification-based machine learning to generate perceptually-plausible content for a missing part (e.g., some or all) of an image. For example, given a latent vector (e.g., random) or incomplete image, an image may be generated which resembles a typical indoor or outdoor scene by filing missing parts with perceptually-plausible content, without necessarily regressing to any particular "ground-truth" or target image from a training dataset. A machine learning model (using a classification loss) may be trained to generate perceptually-plausible content for a missing part with fewer training iterations on training data to produce a quality of results that may have required significantly more training iterations to achieve using traditional architectures (using regression loss).

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120, one or both of which may be in a physical environment.

The electronic device 120 is configured to process or display content. In some implementations, the electronic device 120 includes a suitable combination of software, firmware, or hardware. The content may be provided for display on the electronic device 120 from a recorded source or a live source. For example, content may be stored in a memory on the electronic device 120, the controller 110, or elsewhere. In another example, content may be a stream of frames captured or processed in real time by a camera on the electronic device 120, the controller 110, or elsewhere. The electronic device 120 is described in greater detail below with respect to FIG. 3. In some implementations, the functionalities of the controller 110 are provided by or combined with the electronic device 120, for example, in the case of an electronic device that functions as a stand-alone unit.

In some implementations, the controller 110 is a computing device that is local or remote relative to the physical environment 105. In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.).

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a computer vision (CV) and computer generated reality (CGR) module 240.

The operating system 230 includes procedures for handling various basic system services and for performing hardware dependent tasks.

In some implementations, the image creation module 240 includes a trainer 242, a machine learning module 244, and an image creator 246. The trainer 242 may be configured to train a machine learning model 244 to generate image content based on training data. The trainer 242 may be configured to train a machine learning model 242 to generate image content based on various types of input data including, but not limited to, incomplete image data, vector data, and/or statement data. To that end, in various implementations, the trainer 242 includes instructions or logic therefor, and heuristics and metadata therefor. In some implementations training of the machine learning model occurs separately from the controller 110, for example, in an offline environment such as on a separate cloud/server system.

The machine learning model 244 may include instructions or logic, and heuristics or metadata, useable by the controller 110 to perform one or more tasks without necessarily using explicit instructions, for example, relying on patterns and inference instead. The trainer 242 may build the machine learning model 244 as a mathematical model based on sample data (e.g. training data) in order to make predictions or decisions without being explicitly programmed to perform the task.

Machine learning tasks may be classified into several broad categories. In supervised learning, the trainer 242 builds a mathematical model from a set of data that contains both the inputs and the desired outputs. For example, if the task were determining whether an image contained a certain object, the training data for a supervised learning algorithm could include images with and without that object (the input), and each image would have a label (the output) designating whether it contained the object. Semi-supervised learning techniques develop mathematical models from incomplete training data, where a portion of the sample input does not have labels.

Machine learning can involve classification algorithms and/or regression algorithms. Classification algorithms are used when the outputs are restricted to a limited set of values, e.g., classes. For a classification algorithm that sorts images into folders, the input would be an incoming image and the output would be the name of the folder in which to file the image. For a classification algorithm that identifies corrupt images, the output would be the prediction of either "uncorrupt" or "corrupt", represented by the Boolean values true and false. Regression algorithms are named for their continuous outputs, meaning they may have any value within a range.

Examples of machine learning model 244 include but are not limited to a neural network (e.g., an artificial neural network), decision tree, support vector machine, or Bayesian network.

Neural networks are computing systems vaguely inspired by the biological neural networks of animal brains. Such systems "learn" to perform tasks by considering examples, generally without being programmed with any task-specific rules. A neural network may be a model based on a collection of connected nodes, which loosely model the neurons in an animal brain. Each connection (e.g., edge) between nodes can transmit information (e.g., a signal), from one node to another. A node that receives a signal can process it and then signal additional nodes connected to it. In some neural network implementations, the signal at a connection between nodes is a real number, and the output of each node is computed by some non-linear function of the sum of its inputs. Nodes and connections (e.g., edges) typically have a weight that adjusts as learning proceeds. The weight may increase or decrease the signal at a connection (e.g., edge). Nodes may have a threshold such that the signal is only sent if the aggregate signal crosses that threshold. Typically, nodes are aggregated into layers. Different layers may perform different kinds of transformations on their inputs. Signals travel from the first layer (the input layer), to the last layer (the output layer), possibly after traversing the layers multiple times. Deep learning involves multiple hidden layers in a neural network.

Decision tree learning uses a decision tree as a predictive model to go from observations about an item (represented in the branches) to conclusions about the item's target value (represented in the leaves). Tree models where the target variable can take a discrete set of values are called classification trees. In such tree structures, leaves represent class labels and branches represent conjunctions of features that lead to those class labels. Decision trees where the target variable can take continuous values (typically real numbers) are called regression trees.

Support vector machines (SVMs), also known as support vector networks, are a set of related supervised learning methods used for classification and regression. Given a set of training examples, each marked as belonging to one of two categories, an SVM training algorithm builds a model that predicts whether a new example falls into one category or the other. A SVM training algorithm may be a non-probabilistic, binary, linear classifier. However, methods such as Platt scaling exist to use SVM in a probabilistic classification setting. In addition to performing linear classification, SVMs can efficiently perform a non-linear classification using what is called the kernel trick, implicitly mapping their inputs into high-dimensional feature spaces.

In some implementations, the machine learning model 244 is a classification-based machine learning model trained by the trainer 242 to generate perceptually-plausible content for a missing part (e.g., some or all) of an image. The machine learning model 244 may be trained to generate content for the missing part that appears plausible by learning to generate content that cannot be distinguished from real image content, for example, using adversarial loss-based training or using perceptual loss. The network may be trained with a perceptual loss. Perceptual loss could be defined using structural similarity metric (SSIM) or using features from some layers of machine learning model for another image-based task. An exemplary use of SSIM may be found in "Image Quality Assessment: From Error Visibility to Structural Similarlity," Zhou Wang, Alan C. Bovik, Hamid R. Sheikh, and Eero P. Simoncelli, IEEE TRANSACTIONS ON IMAGE PROCESSING, Vol. 13, No. 4, April 2004, incorporated herein in its entirety by this reference.

To generate the content, a probabilistic classifier may be used to select color attribute values (e.g., RGB values) for each pixel of the missing part of the image. To do so, a pixel color attribute is segmented into a number of bins (e.g., value ranges) that are used as classes. The classifier determines probabilities for each of the bins of the pixel color attribute for each pixel and generates the content by selecting the bin for each pixel for each color attribute having the highest probability.

The image creator 246 may be configured to use the machine learning model 244 to create an image or portion of an image. For example, the image creator 246 may provide a user interface configured to receive input that specifies a portion of an image, accesses the machine learning model 244, and provides an output that includes an image having pixels some or all of which were generated using the machine learning model 244. In some implementations, the output contains the final image (e.g., the full content including both previously-known and machine learning synthesized content). In other implementations, the output contains only content for one or more missing parts that can be post-processed and merged with the known parts.

In another example, the image creator 246 is implemented within an application that automatically adjusts image content for a user. For example, a computer-generated reality (CGR) application may be configured to provide content (e.g., mixed reality content) and may include or access the image creator 246 to create or otherwise complete images that are provided in the CGR environment. To these ends, in various implementations, the image creator 246 includes instructions or logic therefor, and heuristics and metadata therefor. In some implementations the image creation or other machine learning model use (e.g., inference) occurs separately from the controller 110, for example, in an offline environment such as on a separate cloud/server system.

Although these modules and units are shown as residing on a single device (e.g., the controller 110), it should be understood that in other implementations, any combination of these modules and units may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present an CGR experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a computer vision (CV) and computer generated reality (CGR) module 340.

The operating system 330 includes procedures for handling various basic system services and for performing hardware dependent tasks.

In some implementations, the image creation module 340 includes a trainer 342, a machine learning module 344, and an image creator 346. The trainer 342 may be configured to train a machine learning model to generate image content based on training data. The trainer 342 may be configured to train a machine learning model 344 to generate image content based on various types of input data including, but not limited to, incomplete image data, vector data, and/or statement data. To that end, in various implementations, the trainer 342 includes instructions or logic therefor, and heuristics and metadata therefor.

The machine learning model 344 may include instructions or logic, and heuristics or metadata, useable by the electronic device 120 to perform one or more tasks without necessarily using explicit instructions, for example, relying on patterns and inference instead. The trainer 342 may build the machine learning model 344 as a mathematical model based on sample data (e.g. training data) in order to make predictions or decisions without being explicitly programmed to perform the task. Examples of machine learning model 344 include but are not limited to a neural network (e.g., an artificial neural network), decision tree, support vector machine, or Bayesian network.

In some implementations, the machine learning model 344 is a classification-based machine learning model trained by the trainer 342 to generate perceptually-plausible content for a missing part (e.g., some or all) of an image. The machine learning model 344 may be trained to generate content for the missing part that appears plausible by learning to generate content that cannot be distinguished from real image content, for example, using adversarial loss-based training. Perceptual loss may be defined using metrics such as structural similarity metric (SSIM) or using features from pre-trained networks. With respect to using feature from pre-trained networks, a convolutional neural network (CNN) that was trained for an image-based task such as classification or segmentation could be used. Features at some layers can be extracted for both output and training/ground-truth images, and the distance between those features used as a loss. For example, L1 or L2 distances between those features may be used as the loss to be minimized.

To generate the content, a probabilistic classifier may be used to select color attribute values (e.g., RGB values) for each pixel of the missing part of the image. To do so, a pixel color attribute is segmented into a number of bins (e.g., value ranges) that are used as classes. The classifier determines probabilities for each of the bins of the pixel color attribute for each pixel and generates the content by selecting the bin having the highest probability.

The image creator 346 may be configured to use the machine learning model 344 to create an image. For example, the image creator 346 may provide a user interface configured to receive input that specifies a portion of an image, accesses the machine learning model 344, and provides an output that includes an image having pixels some or all of which were generated using the machine learning model 344. In another example, the image creator 346 is implemented within an application that automatically adjusts image content for a user. For example, a computer-generated reality (CGR) application may be configured to provide content (e.g., mixed reality content) and may include or access image creator 346 to create or otherwise complete images that are provided in the provided CGR environment. To these ends, in various implementations, the image creator 246 includes instructions or logic therefor, and heuristics and metadata therefor.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 4:
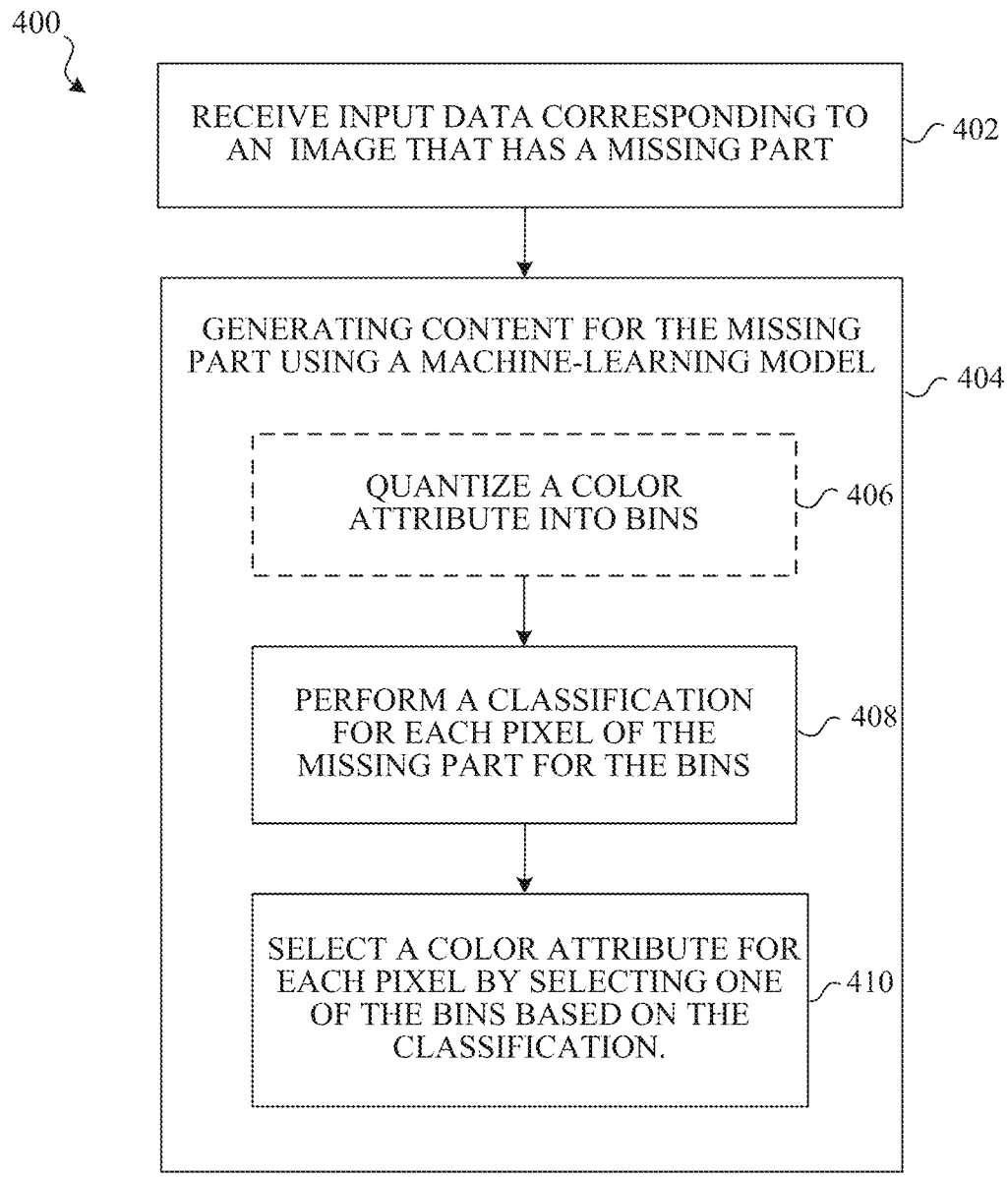
FIG. 4 is a flowchart illustrating an exemplary method for using classification-based machine learning to generate content for a missing part of an image according to some implementations.

FIG. 4 is a flowchart illustrating an exemplary method for using classification-based machine learning to fill a missing part of an image according to some implementations. In some implementations, the method 400 is performed by a device (e.g., controller 100 or electronic device 120 of FIGS. 1-3). The method 400 can be performed at a television, set-top box, mobile device, HMD, desktop, laptop, server device, or by multiple devices in communication with one another. In some implementations, the method 400 is performed by processing logic, including hardware, firmware, software, or a combination thereof. In some implementations, the method 400 is performed by a processor executing code stored in a non-transitory computer-readable medium (e.g., a memory).

At block 402, the method 400 receives input data corresponding to an image that is to be generated or completed. The image has a missing part of pixels for content that is undefined by the input data or otherwise unknown prior to generating content for the missing part. For example, the input data may be an image of pixels for which color values are unknown prior to generating the content or an image for which no pixel information at all is known. The missing part may be a portion of the image or all of the image. The input data may be an image having some pixel defined and some undefined pixels. In some implementations, the input data is a camera image, a digital photograph, a computer-generated image, an image that combines real and virtual content, an equirectangular representation of a 360 degree view of three dimensional (3D) environment, or a cube map representation of a 360 degree view of a 3D environment. In some implementations, the input data is a vector or statement describing attributes of an environment (e.g., "girl on yellow bus looking out window crying on a sunny day"). The input data may identify which pixels of the image are undefined, e.g. via a mask or other data structure.

At block 404, the method 400 generates content for the missing part using a machine-learning model, such as a classification-based neural network.

In the method 400, at least one color attribute is quantized or discretized into bins that will be used as classes by the machine learning model. Accordingly, at block 406, the method quantizes a color attribute into bins. The quantization of a color attribute into bins may occur prior to or as part of the receiving of the input data and the generating of the content. In other words, the bins may be identified as part of a setup process that occurs separately from the generation of particular content items.

An image may be separated into color channels (e.g., RGB channels, Lab channels, HSV channels, etc.) and the values of each channel may be quantized in N bins. The choice of N may depend upon the implementation. In some implementations, uniform bins across the numerical range of each channel are used. In some implementations, bins are determined based on the per channel distribution of natural (e.g., real world) images.

In one example, each color channel may have possible values from 1 to 255 and each color channel may be quantized into 5 bins. In this example, in some RGB-based implementations, the red color channel may have bin 1 for red color values equal to or greater than 0 and less than 51, bin 2 for red color values equal to or greater than 51 and less than 102, bin 3 for red color values equal to or greater than 102 and less than 153, bin 4 for red color values equal to or greater than 153 and less than 204, and bin 5 for red color values equal to or greater than 204 and less than 255. The green color channel may have bin 1 for green color values equal to or greater than 0 and less than 51, bin 2 for green color values equal to or greater than 51 and less than 102, bin 3 for green color values equal to or greater than 102 and less than 153, bin 4 for green color values equal to or greater than 153 and less than 204, and bin 5 for green color values equal to or greater than 204 and less than 255. The blue color channel may have bin 1 for blue color values equal to or greater than 0 and less than 51, bin 2 for blue color values equal to or greater than 51 and less than 102, bin 3 for blue color values equal to or greater than 102 and less than 153, bin 4 for blue color values equal to or greater than 153 and less than 204, and bin 5 for blue color values equal to or greater than 204 and less than 255.

In some implementations, the range of values of different bins for a color attribute vary in size. For example, for use cases involving faces, there may be more bins (e.g., bins having smaller value ranges) for colors associated with common skin tones of faces. As another example, for use some use cases, it may be desirable to select bin sizes based on human perception (e.g., providing more bins for shades of green than for shades of red) based on humans being better able to perceive differences in shades of green than shades of red. The palette of colors selected for the bins may be application-dependent, perceptually-dependent, user-dependent, or otherwise selected according to the requirements of the particular implementation.

At block 408, the method 400 performs a classification for each pixel of the missing part for the bins. The classification may provide probabilities that represent the probability that giving a respective pixel the color attribute value associated with a bin (e.g., the average value of the bin or a random value within the bin's value range) will result in plausible content.

The classification may provide probabilities for multiple pixels of the missing part concurrently and thus produce multi-pixel content for the missing part that produces an overall image that is perceptually plausible. To do so, the machine learning model 244 may have been trained to generate content for the missing part that appears plausible by learning to generate content that cannot be distinguished from real image content, for example, using adversarial loss-based training.

The classification may provide probabilities that are learned based on a classification training process that uses training data having known content for missing parts. Such training may involve computing an output of probabilities for bins of a color attribute and determining a loss by comparing those probabilities with ground truth data associated with the respective pixel. For example, during training the classification may provide the following probabilities for a pixel for each of the 5 bins for the red color channel: 0.0, 0.3, 0.5, 0.2, 0.0. The ground truth for the pixel may be 0, 0, 1, 0, 0 since the training data value for the pixel may have had a red value that falls within bin 3. A loss may be determined (e.g., using a cross entropy comparison) by quantifying the difference between the predicted probabilities and the ground truth probabilities.

In some implementations, a machine learning model such as a generative neural network is trained to generate content for a missing part of an image using a classification loss, an adversarial loss (determined by an adversarial neural network), and/or a perceptual loss. Accordingly, such training may enforce the creation of perceptually-plausible content for a missing part of an image via the determination of pixel color attribute probabilities.

In some implementations, a machine learning model is trained via an iterative training technique. For example, the training may involve initially employing classification using a small palette (e.g., only 8 bins for each color channel) and, as the training progresses, adding additional layers to allow for classification using a larger palette (e.g., using 16 bins for each color channel), and so on.

After performing the classification for each pixel of the missing part for the bins, at block 410, the method 400 selects a color attribute for each pixel by selecting one of the bins having the best probability. For example, the classification may provide probabilities for each of the 5 bins for the red color channel: 0.1, 0.1, 0.5, 0.2, 0.1 for a pixel and the method 400 may select bin 3 for the pixel because its probability is highest. In some implementations, a function, e.g., softmax, argmax, etc., is used to identify the bin of each color channel to be selected for each pixel. The activation layer of the last layer of a neural network, for example, may utilize such a function. If there is a tie, the selected bin may be selected based on additional criteria, e.g., at random, based on the commonality of colors in the rest of the image, based on a user preference, etc. The pixel is then given (e.g., assigned) the color attribute of the value associated with the selected bin, e.g., the average red value of bin 3 (e.g., 128), an assigned value of bin 3 (e.g., 125), or a random value of bin 3 (e.g., 122). In this way, values for the color attributes of all pixels of a missing part of an image can be selected to generate content to fill the missing part.

In some implementations, each of multiple color channels (e.g., each of red, green, and blue) is quantized into bins and a machine-learning model is configured to generate the content by performing a classification for each pixel of the missing part for the bins of each color channel and the method 400 selects the color attribute for each pixel for each channel by selecting one of the bins based on the classification.

In some implementations, the missing part is all of the image and, thus, all of the content of the image is synthesized by the machine-learning model. For example, given the statement "girl on yellow bus looking out window crying on a sunny day", the method 400 may generate an entire image. In such implementations, the machine learning model may be trained to generate image content based on statement-based input. For example, the training may involve statements and corresponding ground truth images that depict the subject matter of the statements.

The method 400 and other techniques disclosed herein may provide various advantages over techniques that do not utilize classification to generate image content. The method 400 and other techniques disclosed herein may utilize a machine learning model that is easier, more efficient, and quicker to train, requiring fewer training iterations and less training data to achieve acceptable quality. The quantization of color attribute values and classification-based selection technique may provide image content having sharper edges and clearer structures than alternative techniques. Created image content may appear sharper and less blurry and provide for reconstructions at higher fidelity than alternative techniques.

In some implementations, one or more post processing steps are employed on the results of the machine learning model, for example, to reduce the effects of quantization. For example, a second machine learning model such as a second neural network, may be trained and employed to increase color resolution. As another example, edge preserving smoothing, such as bilateral or joint-bilateral filtering, may be applied. As another example, global smoothing, such as Gaussian filtering, may be applied.

In some implementations, the method 400 is applied to fill a hole in an image. For example, a user may edit an image to delete an object or portion of the image, and the method 400 may be used to fill in the hole left by that deletion with plausible content.

In some implementations, the method 400 is applied to create content based on easy-to-provide or identify information. For example, the method 400 may generate an object based on text or voice input and/or based on sensor data that generally identifies an intended appearance of the object and/or its environment. For example, an image may be generated based on input data that identifies an object appearance attribute (e.g., old), an object class (e.g., boat), or incident light (e.g., bright sunlight).

In some implementations, the method 400 is applied to create an image based on a relatively simple sketch, outline, or other hand-drawn content.

In some implementations, the method 400 is applied to create translucent content. For example, the input data may include an image or other source of a background of content that is behind a translucent object of the image and information about the transparency (e.g., percentage transparency, tint color, etc.). The method 400 may create content by selecting pixel color attributes that include a transparency level (e.g., 0%, 20%, 100% etc.).

In some implementations, the method 400 is applied to fill in missing parts of a view of a 3D environment. For example, the input data may include an equirectangular representation or a cube map representing a 360 degree view of a three dimensional (3D) environment. Such a representation may having a missing part, e.g., pixels not having any color values due to corruption or the camera that provided the representation not capturing enough data. The method 400 may be used to generate content to fill in one or more of those missing parts to provide a complete (or more complete) view of the 3D environment.

In some implementations, the method 400 is applied to fill in missing parts of a computer-generated reality (CGR) environment. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 5:
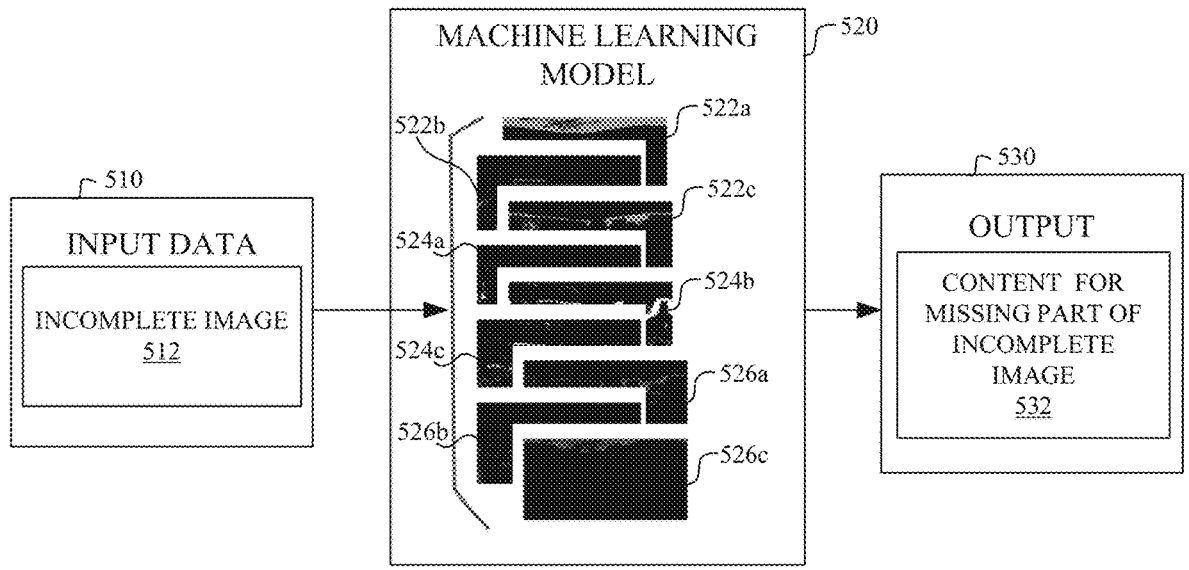
FIG. 5 is a block diagram illustrating an exemplary use of a machine learning model on input that includes an incomplete image according to some implementations.

FIG. 5 illustrates an exemplary use of a machine learning model 520 on input data 510 that includes an incomplete image 512. The machine learning model 520 uses bins 522a-c for multiple ranges of values of a red color channel, bins 524a-c for multiple ranges of values of a green color channel, and bins 526a-c for multiple ranges of values of a blue color channel and performs a classification to predict probabilities for each of the bins for each pixel. One of the bins of each color channel is selected for each pixel of a missing part of the incomplete image 512 to produce output 530 including content for the missing part of the incomplete image 532.

Figure 6:
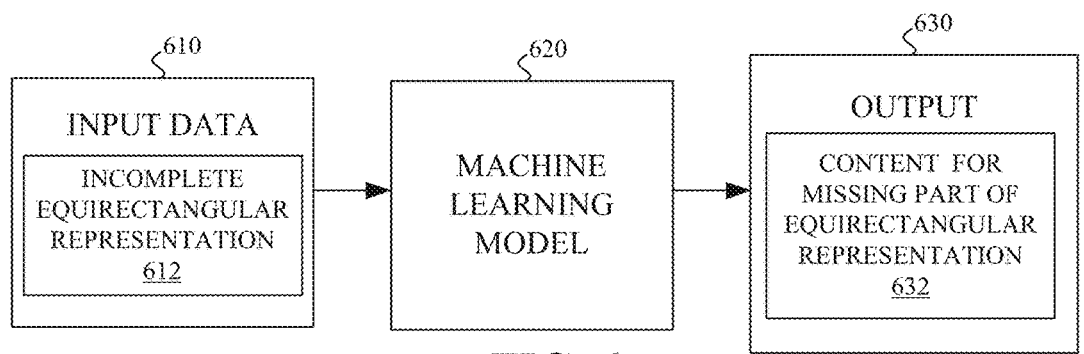
FIG. 6 is a block diagram illustrating an exemplary use of a machine learning model on input that includes an incomplete equirectangular representation according to some implementations.

FIG. 6 illustrates an exemplary use of a machine learning model 620 on input data 610 that includes an incomplete equirectangular representation 612. The machine learning model 620 may use bins for multiple ranges of values of one or more color channels. One of the bins of each such color channel may be selected for each pixel of a missing part of the incomplete equirectangular representation 612 to produce output 630 including content for the missing part of the incomplete equirectangular representation 632.

Figure 7:
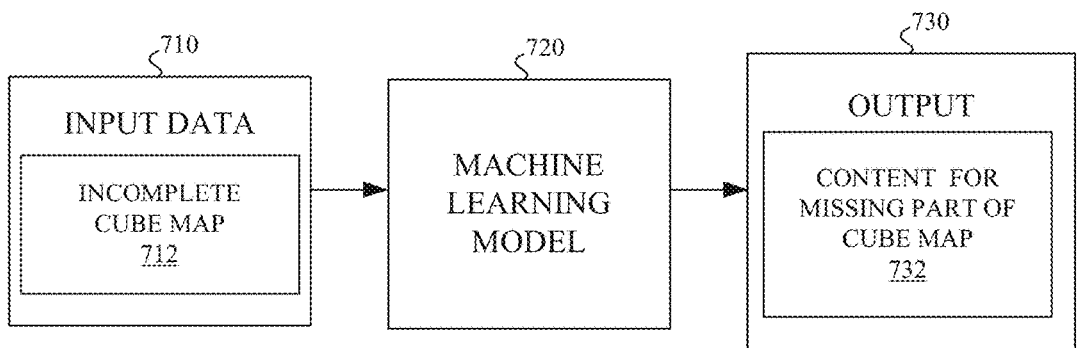
FIG. 7 is a block diagram illustrating an exemplary use of a machine learning model on input that includes an incomplete cube map according to some implementations.

FIG. 7 illustrates an exemplary use of a machine learning model 720 on input data 710 that includes an incomplete cube map 712. The machine learning model 720 may use bins for multiple ranges of values of one or more color channels. One of the bins of each such color channel may be selected for each pixel of a missing part of the incomplete cube map 712 to produce output 730 including content for the missing part of the incomplete cube map 732.

Figure 8:
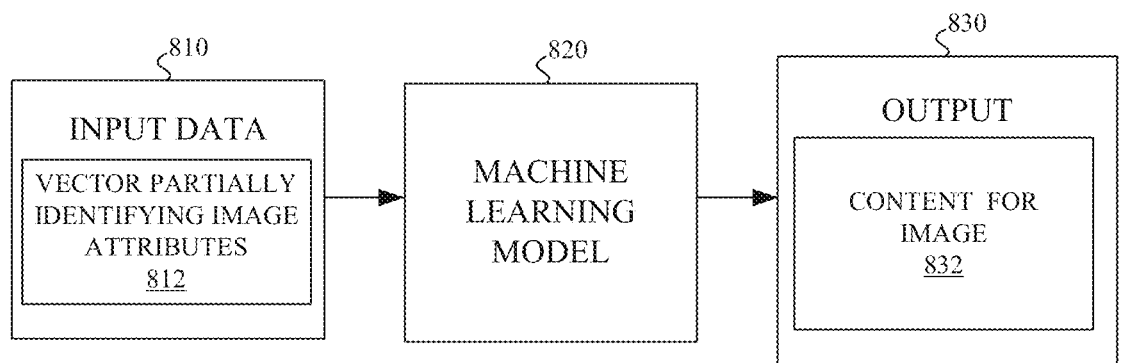
FIG. 8 is a block diagram illustrating an exemplary use of a machine learning model on input that includes a vector that partially identifies image attributes according to some implementations.

FIG. 8 illustrates an exemplary use of a machine learning model 820 on input data 810 that includes a vector that partially identifies image attributes 812. For example, the vector may provide values for attributes of an object or an environment, or both, to be depicted in an image or portion of the image that is to be generated. The machine learning model 820 may use bins for multiple ranges of values of one or more color channels. One of the bins of each such color channel may be selected for each pixel of the image or portion of the image that is to be generated to produce output 830 including content for the image 832.

Figure 9:
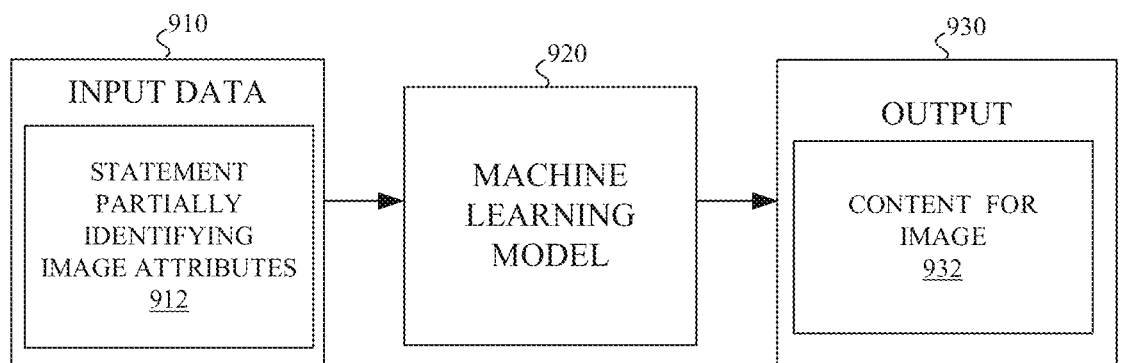
FIG. 9 is a block diagram illustrating an exemplary use of a machine learning model on input that includes a statement that partially identifies image attributes according to some implementations.

FIG. 9 illustrates an exemplary use of a machine learning model 920 on input data 920 that includes a statement that partially identifies image attributes 912, (e.g., "girl on yellow bus looking out window crying on a sunny day"). For example, the statement may provide information that may be extracted to define attributes of an object or an environment, or both, to be depicted in an image or portion of the image that is to be generated. The machine learning model 920 may use bins for multiple ranges of values of one or more color channels. One of the bins of each such color channel may be selected for each pixel of the image or portion of the image that is to be generated to produce output 930 including content for the image 932.

Figure 10:
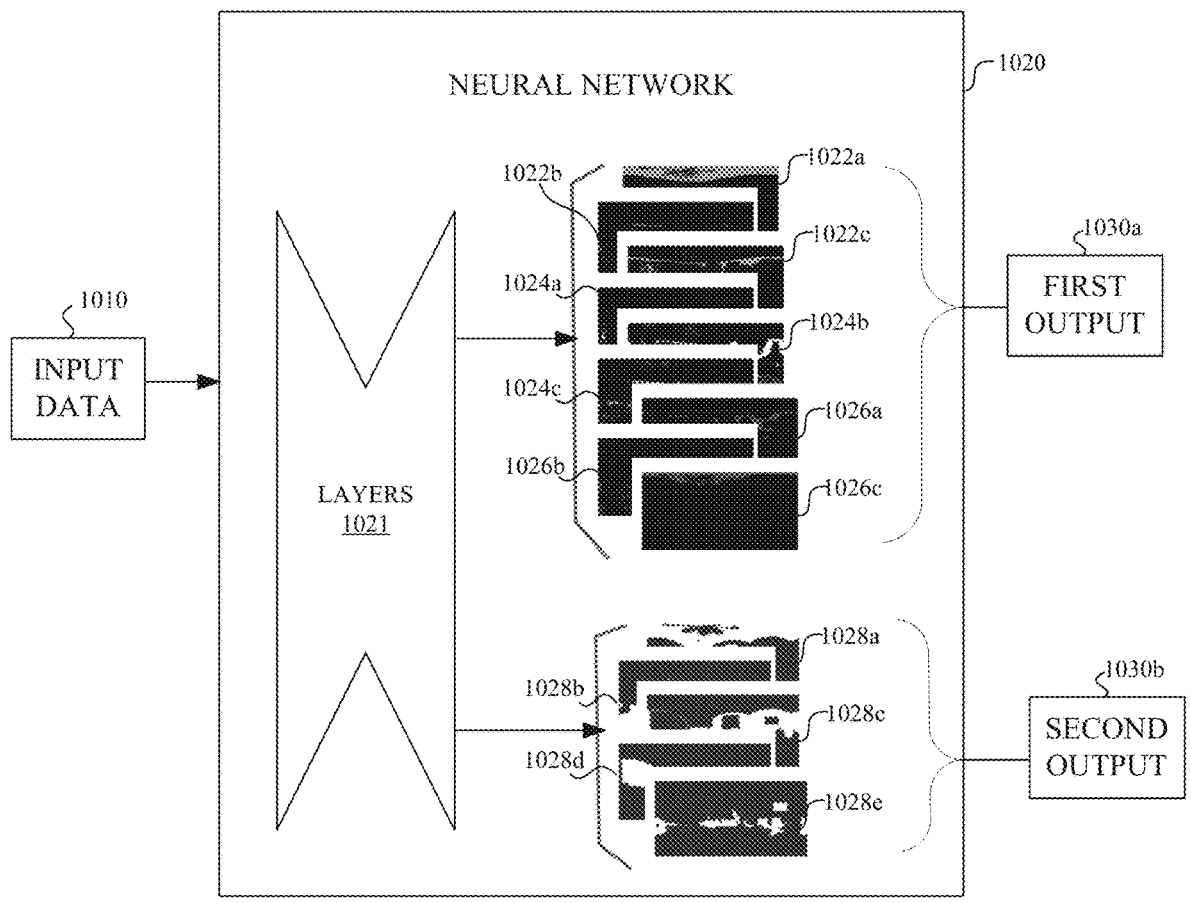
FIG. 10 is a block diagram illustrating an exemplary use of a machine learning model on outputs two different types of information for an image according to some implementations.

In some implementations, the same machine learning model (e.g., neural network) is used for multiple tasks, for example to both generate content and to label each pixel of an image with a semantic category or depth or other attribute. FIG. 10 illustrates an exemplary use of a neural network 1020 to output two different types of information for an image. Input data 1010 (e.g., an incomplete image, a vector, a statement, etc.) is input to the neural network 1020 to produce multiple outputs: first output 1030a and second output 1030b. The neural network 1020 includes layers 1021 that are used in providing both outputs. The layers 1021 of the neural network 1020 may provide information used to assign probabilities to bins 1022a-c, 1024a-c, 1026a-c associated with color attribute value ranges and ultimately to produce the first output 1030 that includes content generated for an image. The layers 1021 of the neural network 1020 may also provide information used to make inferences or predictions 1028a-c about elements 1028a-e that may be used to produce a second output 1030b relating to the image, e.g., providing pixel depth values, semantic segmentation, semantic labeling, etc.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a mobile electronic device having a processor:
   receiving input data corresponding to an image of an environment, wherein the image has a missing part comprising pixels for content that is undefined by the input data; and
   generating content for the missing part of the image by inputting the input data to a machine-learning model, wherein a color attribute is quantized into bins and the machine-learning model is configured to generate the content by performing a classification for each pixel of the missing part for the bins and selecting a color attribute for each pixel by selecting one of the bins based on the classification.

2. The method of claim 1, wherein the missing part comprises pixels for which color values are unknown prior to generating the content.

3. The method of claim 1, wherein the input data comprises an image comprising pixels for which color values are unknown prior to generating the content.

4. The method of claim 1, wherein the input data comprises an equirectangular representation or a cube map representing a 360 degree view of a three dimensional (3D) environment.

5. The method of claim 1, wherein the input data comprises a vector or statement identifying attributes of the image or portion of the image to be generated.

6. The method of claim 1, wherein the input data comprises a mask identifying which pixels of the image are to be generated.

7. The method of claim 1, wherein the missing part is less than all of the image, wherein the image has a defined part comprising pixels for content that are defined by the input data.

8. The method of claim 1, wherein the missing part is all of the image and all of the content of the image is synthesized by the machine-learning model.

9. The method of claim 1, wherein the machine-learning model is a classification-based neural network.

10. The method of claim 1, wherein the classification provides a probability for each of the bins and a bin having the highest probability value for each pixel is selected.

11. The method of claim 1, wherein
    each of multiple color channels is quantized into bins; and
    the machine-learning model is configured to generate the content by performing a classification for each pixel of the missing part for the bins of each color channel and selecting the color attribute for each pixel for each channel by selecting one of the bins based on the classification.

12. The method of claim 1, wherein the machine-learning model is trained using a cross entropy-based classification loss.

13. The method of claim 1, wherein machine-learning model is trained using an adversarial loss that penalizes generation of content that an adversarial network can distinguish from real content.

14. The method of claim 1, wherein machine-learning model is trained using a perceptual loss.

15. The method of claim 1, wherein the content is generated to fill a hole in the image.

16. The method of claim 1, wherein the content is generated to synthesize an object based on input data that identifies an object appearance attribute, an object class, or incident light.

17. The method of claim 1, wherein the content is generated to synthesize a translucent object.

18. The method of claim 1, wherein the content is generated to convert a sketch to an image.

19. The method of claim 1, wherein the content is generated to fill in missing parts of a computer-generated reality (CGR) environment.

20. The method of claim 1, wherein selecting the color attribute for each pixel comprises selecting a color value for a pixel that had an unknown color value prior to generating the content.

21. A system comprising:
    a non-transitory computer-readable storage medium; and
    one or more processors coupled to the non-transitory computer-readable storage medium, wherein the non-transitory computer-readable storage medium comprises program instructions that, when executed on the one or more processors, cause the system to perform operations comprising:
    receiving input data corresponding to an image of an environment, wherein the image has a missing part comprising pixels for content that is undefined; and
    generating content for the missing part of the image by inputting the input data to a machine-learning model, wherein a color attribute is quantized into bins and the machine-learning model is configured to generate the content by performing a classification for each pixel of the missing part for the bins and selecting a color attribute for each pixel by selecting one of the bins based on the classification.

22. The method of claim 20, wherein the color value corresponds to a value identifying a color or a value for a color channel.

* * * * *